US009331928B2

(12) United States Patent
Rao

(10) Patent No.: US 9,331,928 B2
(45) Date of Patent: May 3, 2016

(54) DIAGNOSTIC AGENT IN DEVICE THAT RETRIEVES KEY PERFORMANCE INDICATORS

(75) Inventor: Bindu Rama Rao, Laguna Niguel, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 961 days.

(21) Appl. No.: 11/871,867

(22) Filed: Oct. 12, 2007

(65) Prior Publication Data

US 2008/0091815 A1     Apr. 17, 2008

Related U.S. Application Data

(60) Provisional application No. 60/852,386, filed on Oct. 16, 2006.

(51) Int. Cl.
*G06F 15/173* (2006.01)
*H04L 12/26* (2006.01)
(Continued)

(52) U.S. Cl.
CPC ....... *H04L 43/18* (2013.01); *G06F 8/65* (2013.01); *H04L 41/0233* (2013.01);
(Continued)

(58) Field of Classification Search
CPC . H04L 43/18; H04L 43/0852; H04L 43/0847; H04L 43/0894; H04L 41/0233; H04L 67/34; H04L 67/125; G06F 8/65; H04W 12/08
USPC ............... 718/102; 709/229, 223; 455/418, 455/419–420; 726/15, 1; 370/252
See application file for complete search history.

(56) References Cited

U.S. PATENT DOCUMENTS

| | | | | |
|---|---|---|---|---|
| 5,651,006 A | * | 7/1997 | Fujino | ................. H04L 41/0213 370/408 |
| 5,664,093 A | * | 9/1997 | Barnett | ................. G06F 11/142 706/45 |

(Continued)

FOREIGN PATENT DOCUMENTS

| | | |
|---|---|---|
| EP | 1705872 | 9/2006 |
| GB | 2426151 | 11/2006 |

(Continued)

OTHER PUBLICATIONS

PCT International Search Report dated Sep. 2, 2008.

*Primary Examiner* — Viet Vu
*Assistant Examiner* — Michael A Chambers
(74) *Attorney, Agent, or Firm* — Kilpatrick Townsend & Stockton LLP

(57) ABSTRACT

One disclosed embodiment of an electronic device includes an electronic device comprising an interface for communicating with at least one remote server, and one or more processors operably coupled to the interface and to memory, the one or more processors operable to, at least, create at least one device management object in a device management tree in memory of the electronic device, wherein a value of the at least one device management object is representative of a level of performance of a layer of a data communication protocol, establish a session of communication between the electronic device and a second location using the data communication protocol, receive, during the communication session, a device management message according to a device management protocol standard from the at least one remote server, the device management message accessing the value of the at least one device management object, and send the value of the at least one device management object to the at least one remote server.

20 Claims, 8 Drawing Sheets

(51) Int. Cl.
  *G06F 9/445* (2006.01)
  *H04L 12/24* (2006.01)
  *H04W 12/08* (2009.01)
  *H04L 29/08* (2006.01)

(52) U.S. Cl.
  CPC .......... *H04L 67/125* (2013.01); *H04L 43/0847* (2013.01); *H04L 43/0852* (2013.01); *H04L 43/0894* (2013.01); *H04L 67/34* (2013.01); *H04W 12/08* (2013.01)

(56) References Cited

U.S. PATENT DOCUMENTS

| | | | | |
|---|---|---|---|---|
| 5,941,978 | A * | 8/1999 | Finni | H04Q 3/0062 709/201 |
| 6,993,328 | B1 * | 1/2006 | Oommen | H04W 8/245 455/414.1 |
| 7,353,533 | B2 * | 4/2008 | Wright | G06F 21/32 379/15.03 |
| 7,610,045 | B2 * | 10/2009 | Little | G06F 17/3089 455/414.2 |
| 7,739,366 | B2 * | 6/2010 | Ansari | G06F 11/3466 709/223 |
| 7,747,722 | B2 * | 6/2010 | Kim | H04L 67/125 709/223 |
| 7,783,720 | B1 * | 8/2010 | Allavarpu | G06F 9/541 709/203 |
| 7,974,613 | B1 * | 7/2011 | Shanker | G06F 8/68 455/418 |
| 8,117,293 | B1 * | 2/2012 | Anderson | G06F 8/71 709/203 |
| 8,140,650 | B2 * | 3/2012 | Pulkkinen | H04L 41/0803 709/217 |
| 8,799,359 | B2 * | 8/2014 | Stanev | G06Q 10/06 709/203 |
| 8,892,301 | B2 * | 11/2014 | Park | B60Q 1/08 362/459 |
| 8,892,522 | B2 * | 11/2014 | Sugimoto | G09B 29/10 707/661 |
| 8,897,214 | B2 * | 11/2014 | Jung | H04L 67/24 370/328 |
| 2001/0047393 | A1 * | 11/2001 | Arner | G06F 9/4445 709/216 |
| 2002/0002599 | A1 * | 1/2002 | Arner | G06F 9/4445 709/219 |
| 2002/0152294 | A1 * | 10/2002 | Evans | H04L 41/0233 709/223 |
| 2004/0019808 | A1 * | 1/2004 | Devine | G06F 11/0709 726/4 |
| 2004/0049575 | A1 * | 3/2004 | Ikeda | H04L 12/2803 709/224 |
| 2004/0110487 | A1 * | 6/2004 | Creamer | H04M 15/00 455/411 |
| 2004/0110497 | A1 * | 6/2004 | Little | G06F 17/3089 455/418 |
| 2004/0123153 | A1 * | 6/2004 | Wright | G06F 21/32 726/1 |
| 2005/0055397 | A1 * | 3/2005 | Zhu | H04L 41/0806 709/200 |
| 2005/0080886 | A1 * | 4/2005 | Croy | H04L 41/0213 709/223 |
| 2005/0197135 | A1 * | 9/2005 | Nelson | H04W 88/10 455/453 |
| 2005/0227683 | A1 | 10/2005 | Draluk et al. | |
| 2005/0277403 | A1 * | 12/2005 | Schmidt | G06F 21/10 455/410 |
| 2005/0278342 | A1 * | 12/2005 | Abdo | G06F 9/4843 |
| 2005/0289229 | A1 * | 12/2005 | Kim | H04L 67/125 709/223 |
| 2006/0026228 | A1 * | 2/2006 | Kim | H04L 67/325 709/202 |
| 2006/0047836 | A1 * | 3/2006 | Rao | H04L 63/0272 709/229 |
| 2006/0052091 | A1 * | 3/2006 | Onyon | H04L 29/12047 455/415 |
| 2006/0154649 | A1 * | 7/2006 | Pedersen | G06F 9/4451 455/412.1 |
| 2006/0178129 | A1 * | 8/2006 | Appaji | H04W 4/16 455/405 |
| 2006/0184532 | A1 * | 8/2006 | Hamada | G06F 3/1454 |
| 2006/0190608 | A1 * | 8/2006 | Sahinoja | H04L 29/12594 709/227 |
| 2006/0200658 | A1 * | 9/2006 | Penkethman | G06F 8/65 713/2 |
| 2006/0212937 | A1 * | 9/2006 | Natarajan | H04W 12/02 726/15 |
| 2006/0236325 | A1 * | 10/2006 | Rao et al. | 719/315 |
| 2007/0006207 | A1 * | 1/2007 | Appaji | G06F 8/65 717/168 |
| 2007/0088701 | A1 * | 4/2007 | Rao | 707/8 |
| 2007/0093243 | A1 * | 4/2007 | Kapadekar et al. | 455/419 |
| 2007/0100968 | A1 * | 5/2007 | Ordogh | H04W 28/06 709/220 |
| 2007/0174447 | A1 * | 7/2007 | Kim | G06Q 10/06 709/223 |
| 2007/0192158 | A1 * | 8/2007 | Kim | G06F 9/4843 709/223 |
| 2007/0207800 | A1 * | 9/2007 | Daley | H04L 12/2602 455/425 |
| 2008/0040452 | A1 * | 2/2008 | Rao et al. | 709/219 |
| 2008/0046888 | A1 * | 2/2008 | Appaji | G06F 9/4843 718/102 |
| 2008/0057947 | A1 * | 3/2008 | Marolia | H04L 67/34 455/425 |
| 2008/0168127 | A1 * | 7/2008 | Hernandez | H04L 12/24 709/202 |
| 2008/0220759 | A1 * | 9/2008 | Norrman | H04M 3/42136 455/419 |
| 2009/0044185 | A1 * | 2/2009 | Krivopaltsev | H04L 29/06 717/173 |
| 2009/0239518 | A1 * | 9/2009 | Feuillette | H04L 41/082 455/418 |
| 2010/0036919 | A1 * | 2/2010 | Masson | G06Q 10/107 709/206 |
| 2010/0112997 | A1 * | 5/2010 | Roundtree | H04L 41/0816 455/420 |
| 2012/0144456 | A1 * | 6/2012 | Anderson | G06F 8/71 726/4 |
| 2013/0295902 | A1 * | 11/2013 | Justen | H04W 8/22 455/418 |
| 2013/0342368 | A1 * | 12/2013 | Nathanson | G07C 5/008 340/903 |

FOREIGN PATENT DOCUMENTS

WO 0186985 11/2001
WO WO-0241147 A1 5/2002

* cited by examiner

DIAGNOSTIC AGENT IN DEVICE THAT RETRIEVES KEY PERFORMANCE INDICATORS

The present application makes reference to, claims priority to, and claims benefit of U.S. Provisional Application Ser. No. 60/852,386 entitled "DIAGNOSTIC AGENT IN DEVICE THAT RETRIEVES KEY PERFORMANCE INDICATORS", filed Oct. 16, 2006, the complete subject matter of which is hereby incorporated herein by reference, in its entirety.

In addition, the present application makes reference to U.S. Provisional Patent Application Ser. No. 60/249,606, entitled "System and Method for Updating and Distributing Information," filed Nov. 17, 2000, and International Patent Application Publication No. WO 02/41147 A1, entitled "System And Method For Updating And Distributing Information", filed Nov. 19, 2001, and having publication date Mar. 23, 2002, the complete subject matter of each of which is hereby incorporated herein by reference, in its entirety.

DETAILED DESCRIPTION OF THE INVENTION

Figure 1:
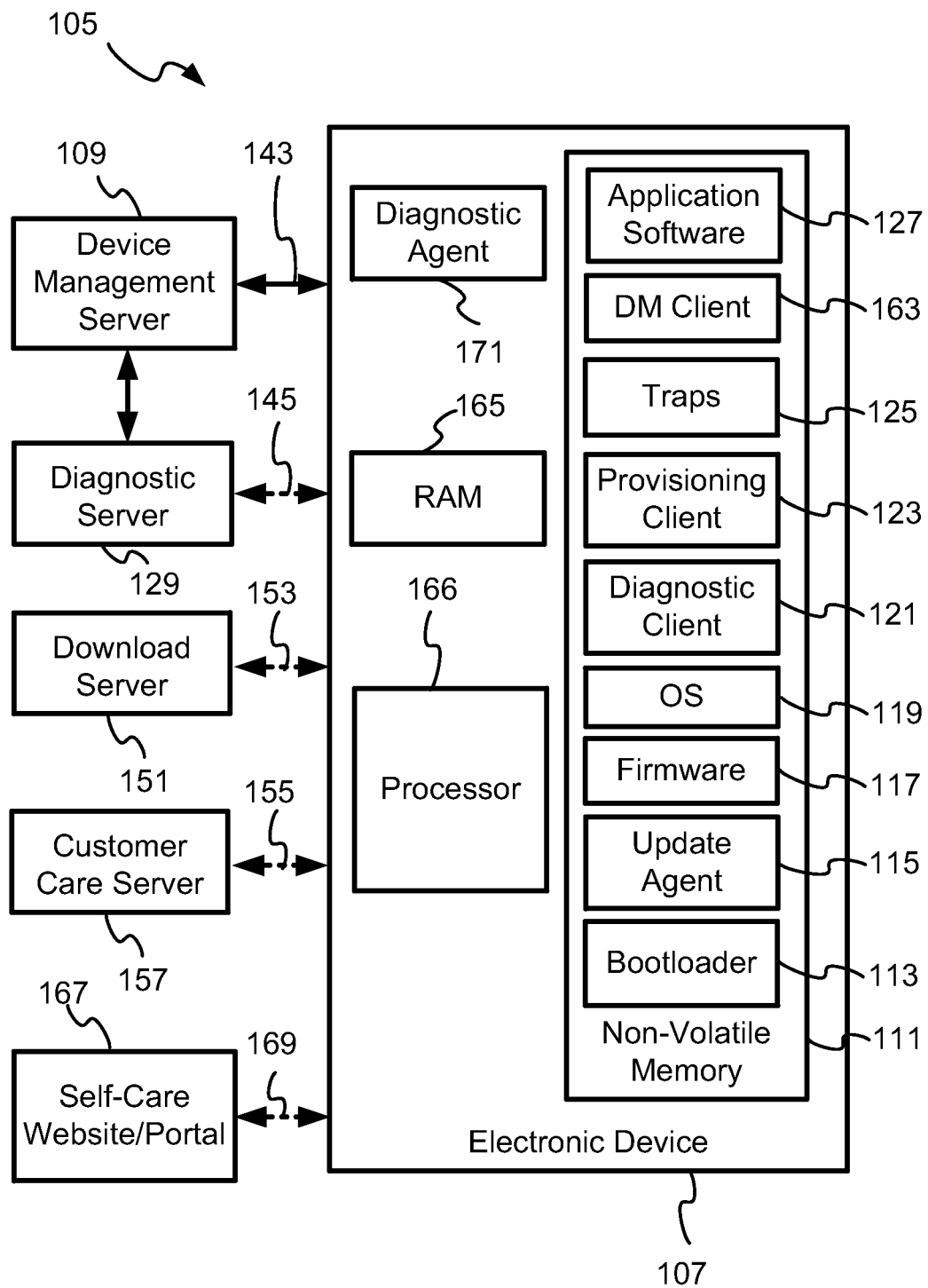
FIG. 1 is a perspective block diagram of an exemplary network that supports remote diagnosis of an electronic device using diagnostics management objects in the electronic device, wherein executables may be downloaded and installed on the electronic device to monitor applications and diagnose problems, in accordance with a representative embodiment of the present invention.

Aspects of the present invention relate generally to the remote management of electronic devices and, more specifically, to methods supporting the remote access to key performance indicators of layers of communication protocols in an electronic device. Key performance indicators comprise one or more of the measures and/or operating parameters that indicate or are representative of a level of performance of a particular portion or layer of hardware, software, and/or firmware supporting a communication protocol in an electronic device. By determining the level of performance or behavior of various portions or layers of a communication protocol in an electronic device during actual use of the electronic device by a user/subscriber, a service provider may be able to recognize a source of a problem in the delivery of a particular communication service/application that is being experienced by a user/subscriber.

As used herein, the term device management may comprise, for example, the processing and distribution of updates for firmware, software, configuration parameters and file systems in memory of an electronic device such as, for example, non-volatile FLASH-type memory. While the following discussion focuses primarily on mobile electronic devices such as, for example, a mobile handset, a cellular phone, a personal digital assistant, a pager, and a handheld personal computer, this is by way of example and not by way of specific limitations of the present invention. The teaching contained herein may also be applicable to a variety of other electronic devices having a processor and memory containing software, firmware, configuration information, data files, and the like, for which updating of memory contents may be desirable.

Representative embodiments of the present invention may be employed during remote device management and diagnosis using wired or wireless communication links such as, for example, a public switched telephone network, a wired local or wide area network, a wired wide area network, an intranet, the Internet, and wireless cellular, paging, local area, personal area, short range, broadcast, metropolitan access, and/or multipoint networks such as those wireless networks referred to as Wi-Fi networks, IEEE 802.11 a/b/g/n compatible networks, networks referred to as WiMax networks, IEEE 802.16d/e networks, the short range wireless technology known as Bluetooth, and similar types of communication links.

In a representative embodiment of the present invention, information for updating memory in an electronic device such as those described above is communicated using, for example, an update package comprising a set of instructions executable by firmware and/or software in the electronic device to transform or convert an existing version of software, firmware, and/or data in the electronic device into a new or updated version of the software, firmware, and/or data. Such an update package may also contain metadata related to the update.

The following definitions, acronyms and abbreviations are use in this document:

| | |
|---|---|
| API | Application Programming Interface |
| CP | Client Provisioning |
| CSR | Customer Service Representative |
| DAO | Data Access Objects |
| DM | Device Management |
| DM Tree | Device management tree |
| GPRS | General Packet Radio Service |
| IMEI | International Mobile Equipment Identity |
| MMV | Refers to a combination of values that define a device make, model and (firmware) version |
| MO | Management Object |
| NVM | Non-Volatile Memory |
| OMA | Open Mobile Alliance |
| RAM | Random Access Memory |
| SMS | Short Message Service |
| SMSC | Short Message Service Center |
| UI | User Interface |
| URI | Universal Resource Identifier |
| URL | Universal Resource Locator |

FIG. 1 is a perspective block diagram of an exemplary network 105 that supports remote diagnosis of an electronic device 107 using diagnostics management objects in the electronic device 107, wherein executables may be downloaded and installed on the electronic device 107 to monitor applications and diagnose problems, in accordance with a representative embodiment of the present invention. The electronic device 107 may, for example, comprise a cellular phone, a personal digital assistant (PDA), a pager, a handheld personal computer (PC), and/or the like. The electronic device 107 may support a number of features and/or applications that may contain software/firmware errors that need to be corrected, or that may provide additional features/benefits by updating the software/firmware. The electronic device 107 may itself be used to request customer care service, including updates to software/firmware, via a customer care server 157. This may be accomplished either directly, using a browser in the electronic device 107, or via a customer service representative (CSR). A CSR may, for example, provide service to the customer using the electronic device 107 by retrieving, as necessary, one or more diagnostic management objects (MOs) stored in memory of the electronic device 107, and by transmitting to the electronic device 107 from a remote server, update information in the form of, for example, one or more update packages. Such update packages may, for example, comprise instructions to code in the electronic device 107 to convert or transform a first version of software/firmware to a second version of software/firmware, in the electronic device 107, in addition to metadata, and checksum information.

As shown in the illustration of FIG. 1, the network 105 in one representative embodiment of the present invention comprises the electronic device 107, a device management (DM) server 109, a self-care website/portal 167, a diagnostic server 129, a customer care server 157, and a download server 151. In one representative embodiment of the present invention, the diagnostic server 129 is an application which receives, processes, and stores/presents the information obtained from the electronic device 107 in an easily readable fashion. The diagnostic server 129 may comprise a personal computer (PC) used by a user to accept collected tracing information from the electronic device 107 through a USB connection, a Bluetooth® connection or via an secure digital format (SD) card (e.g., when a wireless data service for over-the-air (OTA) transfer of data is unavailable). A representative embodiment of the present invention may also comprise other application servers. The electronic device 107 of FIG. 1 is able to communicate with the DM server 109, the download server 151, the customer care server 157, the self-care website/portal 167, and the diagnostic server 129 via communication paths 143, 153, 155, 169, and 145, respectively. Although the communication paths 143, 153, 155, 169, 145 are illustrated as being separate paths between the electronic device 107 and their respective servers, this is only for purpose of illustration, and is not a specific limitation of a representative embodiment of the present invention. The communication paths 143, 153, 155, 169, 145 may be combined into one or more paths that may comprise any of the wired or wireless networks previously mention above, including point-to-point and/or broadcast, wired or wireless communication paths such as, for example, a local area network, a public switched telephone network, a wireless personal, local or wide area network, and a cellular or paging network, to name only a few possibilities. Although not shown in the illustration of FIG. 1, the electronic device 107 also comprises interfaces used to communicate over the communications paths 143, 153, 155, 169, and 145, which have been omitted from the illustration solely to improve clarity to aid in understanding the figure.

As illustrated in FIG. 1, an electronic device in accordance with one representative embodiment of the present invention comprises a processor 166, random access memory (RAM) 165, and non-volatile memory (NVM) 111. The NVM 111 may comprise, for example, NAND or NOR type flash memory or other suitable type of NVM. The NVM 111 may contain a number of software/firmware code components of the electronic device 107 including, for example, application software 127, a device management (DM) client 163, a traps client 125, a provisioning client 123, a diagnostic client 121, an operating system (OS) 119, firmware 117, one or more update agent(s) 115, and a bootloader 113. Additional software/firmware code components may also be present in the RAM 165 and NVM 111. The term "code" may be used herein to represent one or more of executable instructions, operand data, configuration parameters, and other information stored in memory of the electronic device 107, and the term "update package catalog" may be used interchangeably with the term "update package array" to refer to received update information that comprises multiple update packages. The term "application software" or "software application" may be used herein to refer to code that provides functionality apparent to the user of the electronic device 107, as opposed to that code in the electronic device that supports application software such as, for example, an operating system, a file system, software support for communications protocols, and the like. Application software includes, for example, Internet web browsers, calendars and/or contact managers, and software for engaging in a particular user or enterprise task, to name just a few examples. The electronic device 107 may also comprise interface circuitry (not shown) to enable operable connection of a subscriber identity module (SIM) card, that may be employed in accordance with aspects of the present invention described in this document.

In one representative embodiment of the present invention, an electronic device such as, for example, the electronic device 107 of FIG. 1 employs an update package (not shown, stored in RAM 165 or NVM 111) delivered by a remote server such as, for example, the download server 151, to update firmware/software, data and configuration information in memory of the electronic device 107. Such an update package comprises update information including, for example, metadata describing an update, checksums, and instructions executable by one or more update agents such as, for example, the update agent 115 of FIG. 1. The update agent 115 processes a set of executable instructions, which are used as a compact means to encode differences between existing/first and updated/second versions of firmware, software, data, and configuration parameters for the electronic device 107. The executable instructions may be assembled into update packages to be transmitted to the electronic device 107 for use in updating memory of the electronic device 107. One or more update agent(s) 115 in the electronic device 107 process respective portions of the executable instructions from an update package to convert/transform corresponding portions of an existing/first version of code in memory (e.g., RAM 165 and/or NVM 111) of the electronic device 107 to portions of an updated/second version of code. The electronic device 107 may also receive provisioning information from, for example, the device management server 109, the customer care server 157, the diagnostic server 129, and/or a provisioning server to fix configuration problems or reconfigure software and hardware.

As shown in FIG. 1, the electronic device 107 may comprise a diagnostic client 121 that facilitates remote diagnosis. The diagnostic client 121 may have been installed at the time of manufacture of the electronic device 107, or be downloaded at a later time using a wired or wireless link of the electronic device 107. The electronic device 107 may also comprise a diagnostic agent 171 that runs on the electronic device 107 when required by conditions, or on a continuing basis to perform monitoring, and which manages and collects tracing information for transmission to a server such as, for example, diagnostic server 129 using a cellular data network part of communication path 145. The electronic device 107 of FIG. 1 also comprises a traps client 125 that facilitates the setting of traps and retrieving of collected information. The term "trap" may be used herein to refer to an action taken outside of operation of the electronic device for its intended use, by executable code in the electronic device 107 (e.g., the traps client 125) when one or more specified conditions are met. Traps can be used to collect data such as errors, faults encountered while operating the mobile device 107, network performance data, and call setup data, to name just a few examples. Such conditions may be remotely defined by, for example, messages sent by a server such as the diagnostic server 121 or DM server 109, for example. In one representative embodiment of the present invention, the traps client 125 and the diagnostic agent 171 are combined into one embedded diagnostic client component capable of supporting traps as well as collecting diagnostic data and configuration information for eventual transfer to the diagnostic server 129 or the customer care server 157.

The DM client 163 of the electronic device 107 may interact with the DM server 109, the diagnostic client, and the traps client 125, to receive DM commands from the DM server 109 and to implement them in the electronic device 107. The download server 151 may be employed to download firmware and software updates (e.g., update information in the form of, for example, update packages). The download server 151 may also be used to download new firmware/software such as, for example, the diagnostics client mentioned above, which may then be installed and activated in the electronic device 107. The bootloader 113 may be employed at power-up or device reset to move executable code from, for example, the NVM 111, into RAM 165, for execution by processor 166.

As described briefly above, an electronic device in accordance with a representative embodiment of the present invention (e.g., electronic device 107) receives update information (e.g., an update package) for processing by one or more update agents (e.g., update agent 115) to convert/transform software (e.g., application software 127) and/or firmware (e.g., firmware 117) to produce updated software/firmware in the electronic device. In some representative embodiments of the present invention, the update agent 115 comprises multiple update agents, each of the update agents appropriately arranged to process different types of update information for updating different types/formats of software, firmware, user data, and configuration parameters in the memory of the electronic device 107. Each of the update packages received is processed in the electronic device by an appropriate one of the update agent(s) 115 to update an associated type of information in the memory of the electronic device 107.

In one representative embodiment of the present invention, an Open Mobile Alliance (OMA) device management (DM)-based applications server is composed of two parts, an OMA DM-based application, and an OMA DM server such as, for example, the DM server 109 shown in FIG. 1. An OMA DM-based application is mainly focused on business processes, logic, and data. Such an application may reside on any of the servers shown in FIG. 1, or on another server (not shown) that is in communication with a server of FIG. 1, such as, for example, the DM server 109. An OMA DM server, however, is mainly focused on the functionality used to support the OMA DM protocol by which the OMA DM-based application manipulates OMA DM-capable electronic devices such as, for example, the electronic device 107 of FIG. 1.

A customer care server such as, for example, the customer care server 157 of FIG. 1, may provide an application programming interface (API) for issuing OMA DM commands and values to OMA DM capable electronic devices, including the ability to explore the device management tree (DM tree) on the electronic device. Bootstrapping the electronic device may be supported, along with the ability to configure one or more bootstrap messages. A customer care server such as the customer care server 157 may support a simple graphical user interface (UI) to allow OMA DM compatible electronic devices to be bootstrapped, and for commands to be issued to allow the electronic device to be explored and configured via a browser such as, for example, an Internet browser.

In one representative embodiment of the present invention, the code to support OMA DM-based device management for customer care activities of a customer care server (e.g., customer care server 157 of FIG. 1) is shared with an OMA DM-based application server. Such a representative embodiment of the present invention helps a system operator to ensure that an application server and a customer care server produce identical behavior in their interactions with electronic devices under OMA DM-based device management.

An OMA DM common framework in accordance with one representative embodiment of the present invention provides for the real-time sharing of data by multiple OMA DM Based applications, and may include sharing of the data from a DM tree in an electronic device such as the electronic device 107 of FIG. 1. In a representative embodiment of the present invention, each OMA DM-based application may access the data used to create OMA DM commands for the electronic device 107.

Currently, each manufacturer of an electronic device such as the electronic device 107 of FIG. 1 may place electronic device setting parameters (e.g., GPRS setting) in different locations within the DM tree of an electronic device they manufacture. This may cause the node uniform resource identifier (URI) of a given parameter to be different for each electronic device make, model, and version (MMV). Some representative embodiments of the present invention provide a data store to be used in managing DM tree information. Such a data store may hold single device information such as the international mobile equipment identity (IMEI) of the electronic device, a password, and a nonce, to name only a few examples. Some data may be customized for each OMA DM-based application including, for example, the type of authentication scheme to be used, and bootstrap content. Some representative embodiments of the present invention allow a user of a customer care system to modify the bootstrap content, to specify the security type and profile type for devices. The security type may, for example, be one or both of "Networkpin" and "Userpin". Some representative embodiments of the present invention permit notification and bootstrap functionality to be shared by OMA DM-based customer care and application servers such as the customer care server 157 and DM server 109 of FIG. 1, for example. Such an arrangement permits a user of the customer care server to specify, for example, a short message service center (SMSC) to be used for the sending of notification and bootstrap messages. Some representative embodiments of the present invention provide this functionality through a set of APIs and call back services that support the sending of DM commands and receipt of results.

A DM server such as, for example, the DM server 109, in a representative embodiment of the present invention employs management objects (MOs) to enable electronic device management operation such as, for example, storing information, retrieving information, and activating or invoking functionality in the electronic device 107, to name only a few operations. Managements objects and their nodes and sub-nodes of representative embodiments of the present invention are extensions to those defined by a device management protocol such as, for example, the Open Mobile Alliance (OMA) device management (DM) V1.2 protocol, developed under the direction of the Open Mobile Alliance, Ltd. For example, in a representative embodiment of the present invention, a DM server (e.g., the DM server 109) sends one or more commands to a DM client (e.g., the DM client 163) of an electronic device (e.g., the electronic device 107), instructing the DM client 163 in the electronic device 107 to set identified management objects in a management tree stored in memory (e.g., non-volatile memory) of the electronic device 107 to a particular value. The management objects managed by the DM server 109 and the DM client 163 of the electronic device 107 may, for example, direct the electronic device 107 to store parameters in a particular parameter/variable, fetch the value of a particular parameter/variable, execute code in the electronic device 107 to perform diagnostic functionality in the electronic device 107, or to return results of previous diagnostic activity to a server.

As described briefly above, the network 105 of FIG. 1 is able to conduct remote diagnostics on the electronic device 107. This is desirable when a user of the electronic device 107 experiences operational issues that he/she cannot resolve. Some operational anomalies may be resolve by analysis of settings in the electronic device 107, which may be retrieved by the customer care server 155 and/or the diagnostic server 129, for example. In some situations, a customer care representative may employ a representative embodiment of the present invention to download and install executable code in the electronic device 107, to actively monitor applications and diagnose problems.

In a representative embodiment of the present invention, the electronic device 107 may be used to request customer care service via a customer care server 157. During such activities, device capability information may be provided to the customer care server 157, or other server, for example. A customer service representative (CSR) in communication with the customer care server 157 provides service to the customer using the electronic device 107, after reviewing/analyzing the device capability information retrieved from the electronic device 107. This makes it unnecessary for a customer to provide such information himself to a CSR, and avoids errors. In this manner, the network 105 of a representative embodiment of the present invention supports performance of remote diagnostics by a CSR, using a server having the functionality of the customer care server 157 of FIG. 1.

In a representative embodiment of the present invention, the customer care server 157 or DM server 109 also supports diagnostic data collection requests from a diagnostic server such as the diagnostic server 129 of FIG. 1, and the return of collected diagnostics data to the diagnostics server 129. Diagnostics data collected by the electronic device 107 may be sent in either push or pull mode by the electronic device 107 to any authorized server in the network 105.

Figure 2:
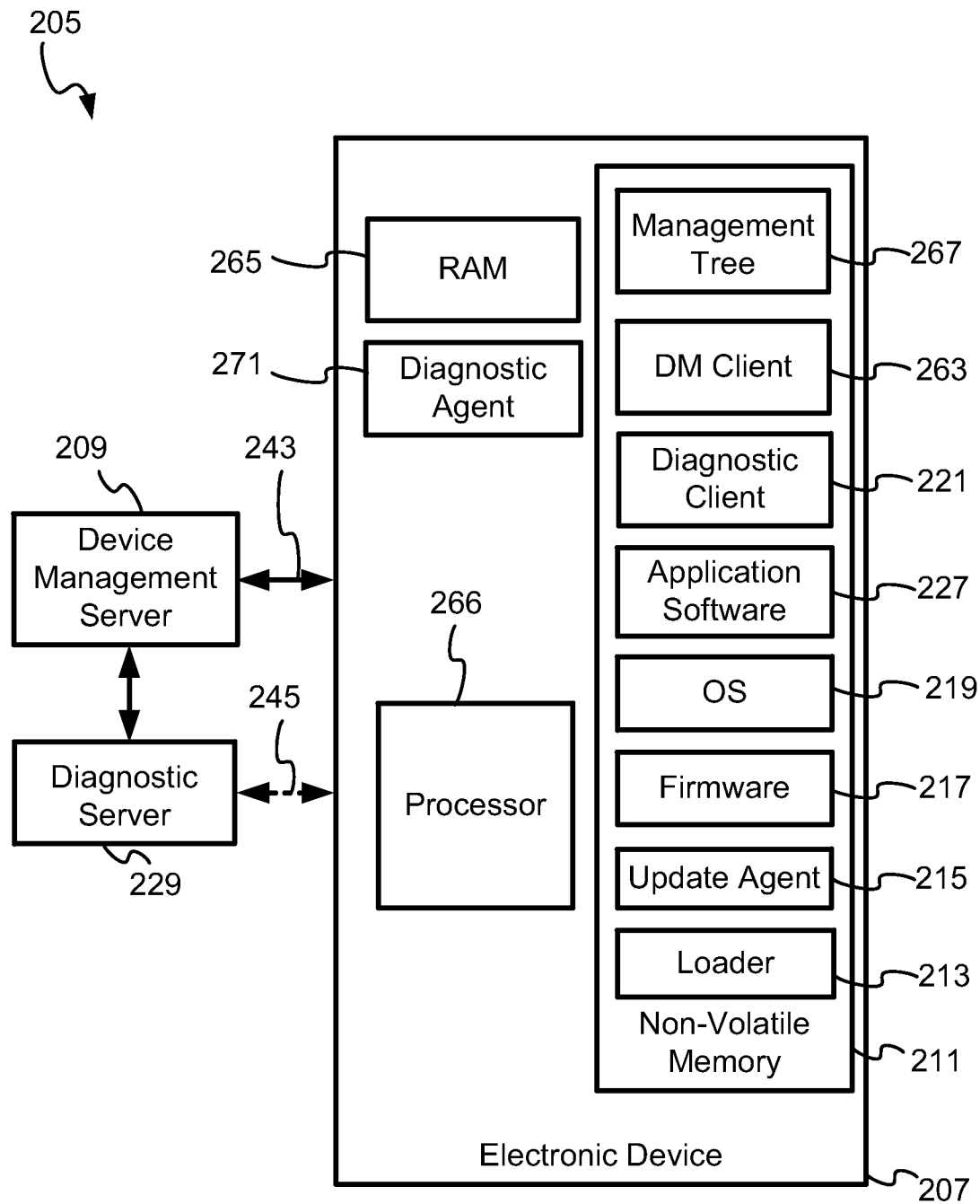
FIG. 2 is a block diagram of an exemplary electronic device that may correspond to, for example, the electronic device of FIG. 1, with non-volatile memory that contains a device management tree comprising management objects for key performance indicators, in accordance with an embodiment of the present invention.

FIG. 2 is a block diagram of an exemplary electronic device 207 that may correspond to, for example, the electronic device 107 of FIG. 1, with non-volatile memory 211 that contains a device management tree 267 comprising management objects for key performance indicators, in accordance with an embodiment of the present invention. Although the electronic device 207 of FIG. 2 may correspond to the electronic device 107 of FIG. 1, some of the elements shown in FIG. 1 have been omitted from FIG. 2, for reasons of clarity. As illustrated, the electronic device 207 of FIG. 2 comprises a processor 266, random access memory (RAM) 265, and the nonvolatile memory 211 that may correspond to, for example, the processor 166, random access memory (RAM) 165, and the nonvolatile memory 111 of the electronic device 107 of FIG. 1. The non-volatile memory 211 may comprise any suitable type of non-volatile memory such as, for example, FLASH-type non-volatile memory. In the exemplary embodiment of the present invention illustrated in FIG. 2. the non-volatile memory 211 comprises a device management (DM) client 263, application software 227, an operating system (OS) 219, firmware 217, one or more update agents 215, and a loader 213. These portions of the non-volatile memory 211 may correspond to, for example, the device management (DM) client 163, application software 127, the operating system (OS) 119, the firmware 117, the one or more update agents 115, and the boot loader 113 shown in electronic device 107 of FIG. 1. In a representative embodiment of the present invention, the electronic device 207 of FIG. 2 may be communicatively coupled in a wired or wireless fashion via communication paths 243 and 245 to a device management (DM) server 209 and a diagnostic server 229, respectively. Although two communication paths 243 and 245 are shown in FIG. 2, in a representative embodiment of the present invention, the electronic device 207 communicates with various servers over, for example, a common communication path such as those described above with respect to the electronic device 107 of FIG. 1, or over two or more paths of various types such as communication paths 243, 245.

In a representative embodiment of the present invention, a server such as, for example, the DM server 209 or diagnostic server 229 accesses one or more management objects (MOs) representing key performance indicators in a management tree, such as the management tree 267, to determine the performance or operating behavior of one or more layers of a communication protocol used in supporting an application on the electronic device 207. For example, different layers of functionality of a communication protocol in an electronic device such as a network layer, a service layer, and an application layer may each have its own set of key performance indicator (KPI) values.

Although reference is made herein to network, service, and application layers, this is by way of illustration or example, and does not represent a specific limitation of an embodiment of the present invention. A representative embodiment of the present invention may be employed with a greater or lesser number of and/or different protocol layers. For example, aspects of the present invention may also be employed in an electronic device using the Open System Interconnect (OSI) model, which defines seven protocol layers. In comparison to the OSI model, the network layer in a representative embodiment of the present invention may correspond to, for example, the functionality of the "physical", "data link", and "network" layers of the OSI model. In a representative embodiment of the present invention, the service layer may correspond to, for example, the functionality of the "session" and "transport layers" of the OSI model. In a representative embodiment of the present invention, the application layer may correspond to, for example, the functionality of the "presentation" and "application" layers of the OSI model.

The term "key performance indicator" (KPI) is used herein to refer to any of a number of measurable parameters related to the operation of any of the layers of a communication protocol, up to and including a user application. Examples of key performance indicators used at one or more of the network, service, and application layers described above include, for example, for both uplink and downlink paths—available free memory and/or memory buffers; amount of processor real time available and/or in use; communication bit, block, frame, and/or packet error rates; communication network delay and/or latency; a number and/or frequency of occurrence of dropped connections; burst data rates; and measurements related to radio frequency communication quality such as band or radio frequency in use, a signal-to-noise ratio, and an Eb/No. Indications of user preferences such as a user selection of channel; user selected screen size; frame rates, bit rates, color resolution, to name only a few examples, may also be employed as key performance indicators in representative embodiments of the present invention.

For example, application software in an electronic device may support the consumption of streaming video content, and may request that a service layer capability establish a communication link having a particular rate of data transfer between the electronic device and a server transmitting or receiving the content. At the application layer, a software application may select a service layer protocol and request establishment of a communication path between the electronic device, and a server. The service layer capability in the electronic device may elect to employ multiple concurrent communication links in order to support a requested data transfer rate. Using the capabilities of a network layer protocol, the service layer may employ network layer capabilities of the electronic device to initiate establishment of the number of communication links needed to provide the requested rate of data transfer. The service layer may manage each of those multiple communication links, establishing new links and/or dropping existing links, as necessary, to maintain the requested rate of data transfer. An inability of the service layer to gain access to any of a number of resources such as, for example, sufficient usable memory in the electronic device and/or a sufficient number of communication links to servers supporting the application, may impact the data rate of an electronic device available to the application layer software/firmware, resulting in delivery to the user of less than the desired level of performance.

A user that experiences poor performance of an electronic device application that involves the exchange of digital content between the electronic device and one or more remote service providers has no means to determine the actual cause of the unsatisfactory user experience. Poor performance of one or more of the network, service, and/or application layers involved in the delivery of the content may impact the overall experience of the user. In the prior art, it is unlikely that the user of the electronic device, the provider of wireless service, or the operator of the of the servers engaged in exchanging content with the electronic device are able to determine the exact cause of poor performance and impact upon the user experience, because they are unable to access the key performance indicators of the elements of the communication path between the content and the user, during the communication activity.

In a representative embodiment of the present invention, each of the exemplary protocol layers used to illustrate the issues at hand may be outfitted to permit remote retrieval of key performance indicators. In a representative embodiment of the present invention, the retrieval of such key performance indicators is enabled through the user of management objects in a device management tree such as, for example, the management tree 267 shown in FIG. 2.

A device management tree such as, for example, the device management tree 267 of FIG. 2 comprises a hierarchical tree structure stored in the memory of an electronic device such as the electronic device 207 of FIG. 2. Each node or "management object" in the device management tree structure is accessible using an address such as, for example, a universal resource identifier that identifies the location of the management object in the device management tree. Each management object may consist of a single node, or may comprise a collection of nodes that are related in some way. Each node has an associated value or contents. Such management objects may be created, set, and accessed remotely, by a server such as, for example, the DM servers 109, 209 of FIG. 1 and FIG. 2. In some representative embodiments of the present invention, values of the nodes of management objects in a DM tree such as the DM tree 267 of FIG. 2 may be manually set by a user of the electronic device, or may be values resulting from operation of various processes in the electronic device 207 such as, for example, the functioning of the network, service, and application layers of a protocol used to support the exchange of digital information by the electronic device 207. In a representative embodiment of the present invention, such management objects are extensions to the set of standardized management objects supported by a device management protocol such as, for example, the Open Mobile Alliance (OMA) device management (DM) version 1.2 protocol developed under the guidance of the Open Mobile Alliance, Ltd. In accordance with an embodiment of the present invention, key performance indicators as described herein are values or data associated with one or more nodes in a device management tree such as the DM tree 267 of FIG. 2.

It should be noted that although the use of key performance indicators in accordance with a representative embodiment of the present invention is explained herein in the context of a wireless mobile electronic device, this is by way of illustration, and does not represent a specific limitation of an embodiment of the present invention. Key performance indicators such as those described herein may be employed in wireless or wired electronic devices, without departing from the scope of the present invention.

Figure 3:
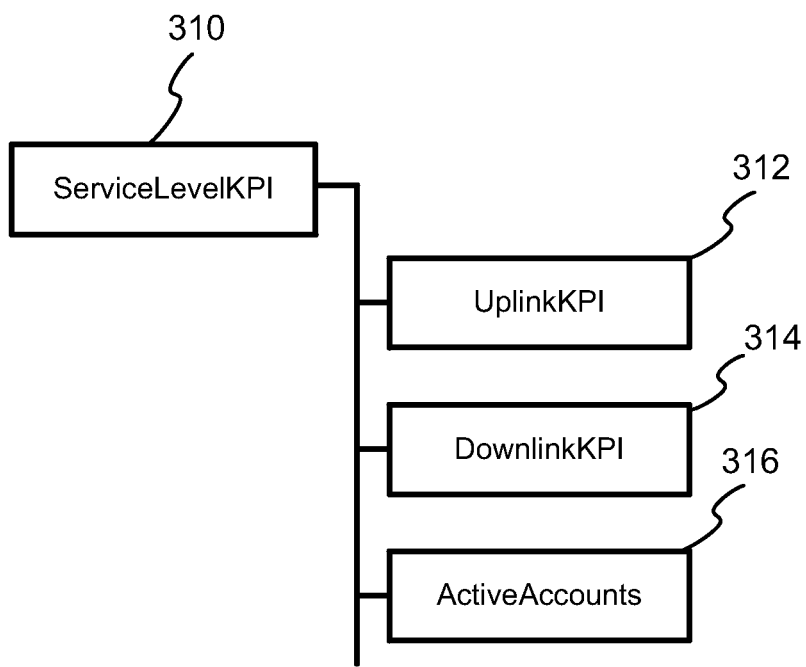
FIG. 3 is a block diagram illustrating the elements of an exemplary service level key performance indicator device management object ServiceLevelKPI MO that may reside, for example, in a device management structure such as the management tree shown in FIG. 2, in accordance with a representative embodiment of the present invention.

FIG. 3 is a block diagram illustrating the elements of an exemplary service level key performance indicator device management object ServiceLevelKPI MO 310 that may reside, for example, in a device management structure such as the management tree 267 shown in FIG. 2, in accordance with a representative embodiment of the present invention. As shown in FIG. 3, the exemplary ServiceLevelKPI MO 310 is an identifiable portion of a management tree that has a node UplinkKPI 312, a node DownlinkKPI 314, and a node ActiveAccounts 316. The ServiceLevelKPI MO 310 and its nodes UplinkKPI 312, DownlinkKPI 314, and ActiveAccounts 316 may be present in the device management tree 267 in the non-volatile memory 211 of the electronic device 207 at the time that the electronic device is manufactured, or it may be added sometime later, such as at the time of provisioning of the electronic device 207 for an associated service at or about the time of sale of the electronic device 207, or during a later update of the electronic device 207.

In the representative embodiment of the present invention shown in FIG. 3, the UplinkKPI 312 comprises a management object related to electronic device behavior or performance during communication in the "uplink" direction or, from the electronic device 207 to a remote server or service provider. In a similar manner, the DownlinkKPI 314 comprises a management object related to electronic device behavior or performance during communication in the "downlink" direction or, from a remote server or service provider to the electronic device 207. A representative embodiment of the present invention may also have a node such as the ActiveAccounts 316 node that comprises a management object that contains account information related to access to services subscribed to/supported by the electronic device 207.

As describe above, in one representative embodiment of the present invention, the ServiceLevelKPI MO 310 is added to a device management tree such as, for example, the DM tree 267 in memory of the electronic device 207 of FIG. 2, when the associated service is installed or enabled on the electronic device 207. Installation of a new service in the electronic device 207 includes associated program code for the service and for measurement of any related key performance indicators. Program code that enables access to the values/contents of the key performance indicators for the new service is also installed in memory of the electronic device 207, permitting a remote device management server such as the DM server 209 of FIG. 2 to access the elements of the ServiceLevelKPI MO 310 when desired. The values/contents of the ServiceLevelKPI MO 310 retrieved by the remote server are determined and made accessible by program code associated with the newly installed service.

Figure 4:
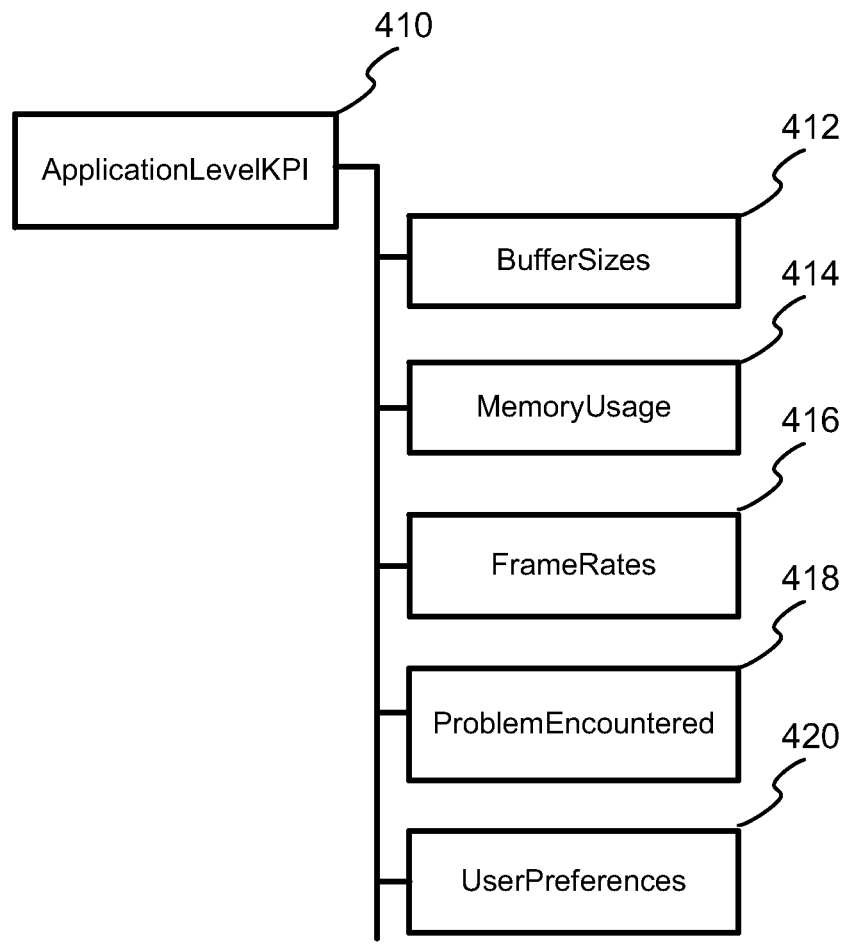
FIG. 4 is a block diagram illustrating the elements of an exemplary application level key performance indicator device management object ApplicationLevelKPI MO that may reside, for example, in a device management structure such as the management tree shown in FIG. 2, in accordance with a representative embodiment of the present invention.

FIG. 4 is a block diagram illustrating the elements of an exemplary application level key performance indicator device management object ApplicationLevelKPI MO 410 that may reside, for example, in a device management structure such as the management tree 267 shown in FIG. 2, in accordance with a representative embodiment of the present invention. As shown in FIG. 4, the exemplary ApplicationLevelKPI MO 410 is an identifiable portion of a management tree that has a node BufferSizes 412, a node MemoryUsage 414, a node FramesRates 416, a node ProblemEncountered 418, and a node UserPreferences 420. As in the case of the ServiceLevelKPI MO 310 described above, the ApplicationLevelKPI MO 410 and its nodes BufferSizes 412, MemoryUsage 414, FramesRates 416, ProblemEncountered 418, and UserPreferences 420 may be present in the device management tree 267 in the non-volatile memory 211 of the electronic device 207 at the time that the electronic device is manufactured, or it may be added sometime later, such as at the time of provisioning of the electronic device 207 for an associated service at or about the time of sale of the electronic device 207, or during a later update of the electronic device 207.

In the representative embodiment of the present invention shown in FIG. 4, the content of node BufferSizes 412 may comprise information identifying the size of buffers used by the application associated with the ApplicationLevelKPI MO 410. By retrieving such information, a remote server such as, for example, the DM server 209 or a customer care representative at a customer care server such as the customer care server 157 of FIG. 2 is able to determine whether a backlog of content is present at the application level in the electronic device 207. If node BufferSizes 412 provides information for both uplink and downlink directions, the DM server 209 or the customer care server 157 may determine whether the uplink path has insufficient capacity or has failed (if the buffer size for the uplink direction swells), or that the electronic device 207 is unable to process content quickly enough (if the downlink buffer size grows.) If the content of the node MemoryUsage 414 is determined to be higher than expected, the DM server 209 may determine that, for example, free/usable memory is in short supply in the electronic device 207, that a memory failure has occurred, or that the application software associated with the ApplicationLevelKPI MO 410 or another software application on the electronic device 207 has consumed large amounts of free memory. In this latter case, a customer care representative observing such a key performance indicator value may, for example, advise the user of the electronic device 207 to stop operation of any unneeded application software running on the electronic device 207, to help free memory for use by the application associated with the ApplicationLevelKPI MO 410.

Some representative embodiments of the present invention, such as that shown in FIG. 4, comprise a node FramesRates 416 that contains information that identifies the number of frames transferred between the electronic device 207 and a remote content server such as, for example, download server 151 of FIG. 1. During the use of a streaming video application a user may experience performance issues, and a remote server such as the DM server 209 or diagnostic server 129 may, for example, retrieve the FramesRates 416 node and determine that distortions or jitter in displayed images is caused by a lower than acceptable frame rate, or that the user is requesting a frame rate that is not supportable using the level of communication service supported by the user's current subscription. In addition, a node such as ProblemEncountered 418 may be used to determine the types of some of the problems that the software application on the electronic device 207 is encountering including, for example, the loss/dropping of frames, and issues stemming from problems with the user's services account. A node such as the UserPreferences 420 node shown in FIG. 4 may also reveal that the user has set the associated application to operate with a screen size that is not supportable by the electronic device 207, or by the communication bandwidth currently available.

Figure 5:
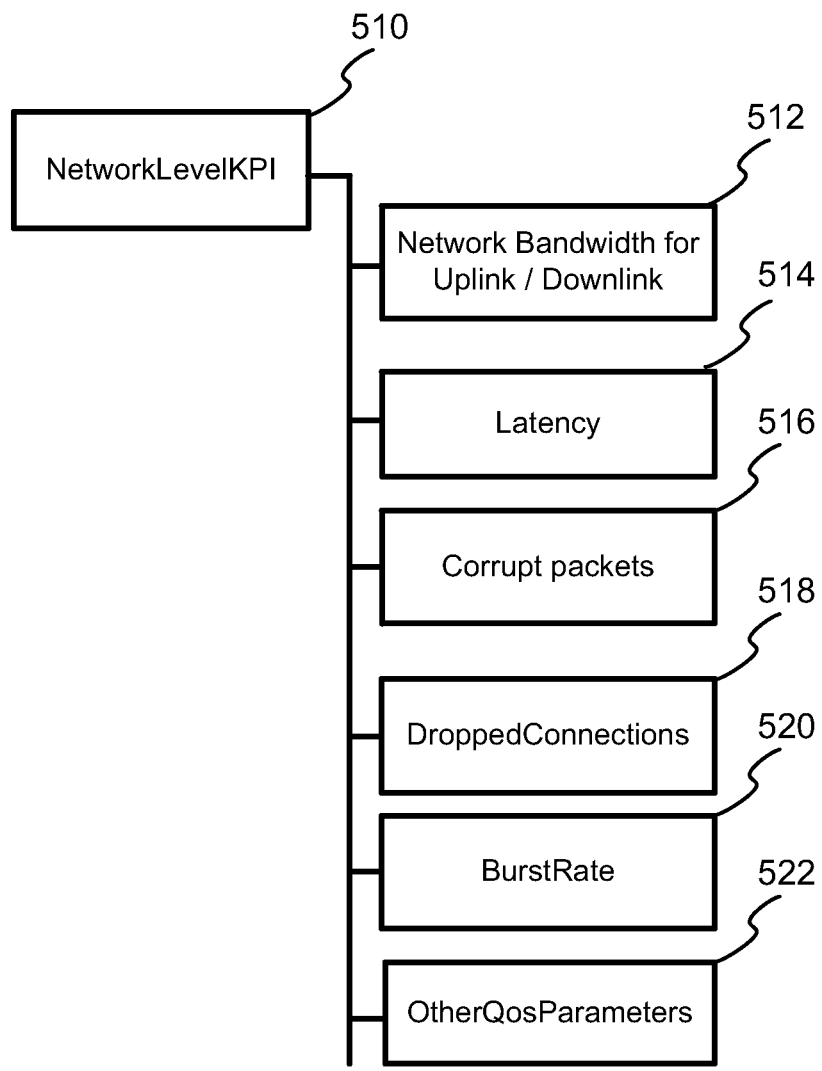
FIG. 5 is a block diagram illustrating the elements of an exemplary network level key performance indicator device management object NetworkLevelKPI MO that may reside, for example, in a device management structure such as the management tree shown in FIG. 2, in accordance with a representative embodiment of the present invention.

FIG. 5 is a block diagram illustrating the elements of an exemplary network level key performance indicator device management object NetworkLevelKPI MO 510 that may reside, for example, in a device management structure such as the management tree 267 shown in FIG. 2, in accordance with a representative embodiment of the present invention. As shown in FIG. 5, the exemplary NetworkLevelKPI MO 510 comprises an identifiable portion of a management tree that has a Network Bandwidth for Uplink/Downlink node 512, a Latency node 514, a CorruptPackets node 516, a DroppedConnections node 518, a BurstRate node 520, and an OtherQoSParameters node 522. As in the case of the ServiceLevelKPI MO 310 and ApplicationLevelKPI 410 described above, the NetworkLevelKPI MO 510 and its nodes may be present in the device management tree 267 in the non-volatile memory 211 of the electronic device 207 at the time that the electronic device is manufactured, or it may be added sometime later, such as at the time of provisioning of the electronic device 207 for an associated service at or about the time of sale of the electronic device 207, or during a later update of the electronic device 207.

In some representative embodiments of the present invention, the NetworkLevelKPI MO 510 contains information related to a particular bearer or communication service provider in the management tree 267 of FIG. 2. In such an embodiment of the present invention, the management tree 267 comprises a NetworkLevelKPI MO 510 for each communication traffic bearer available for use by the electronic device 207.

In some representative embodiments of the present invention, each bearer-specific NetworkLevelKPI MO 510 comprises a collection of nodes such as those shown in FIG. 5. The content of the first of these illustrated nodes, Network Bandwidth for Uplink/Downlink 512, comprises information identifying the amount of network bandwidth currently in use by the electronic device using the associated bearer. The context of the next node, Latency 514, enables a remote server to determine the delay or latency currently being experienced by content exchanged via the associated bearer. The CorruptPackets node 516 may be retrieved to access a measure of the number of corrupted packets received by the electronic device when using the associated bearer. The DroppedConnection node 518 shows a frequency/count of connections that are unintentionally dropped or lost following establishment. The BurstRate node 520 contains a measure of the data rate for burst rate traffic, and the OtherQoSParameters node 522 may contain other quality of service measures and parameters that may be verified when retrieved from the electronic device 207 and compared with a network subscriber information database, to verify correct settings in the electronic device 207.

Figure 6:
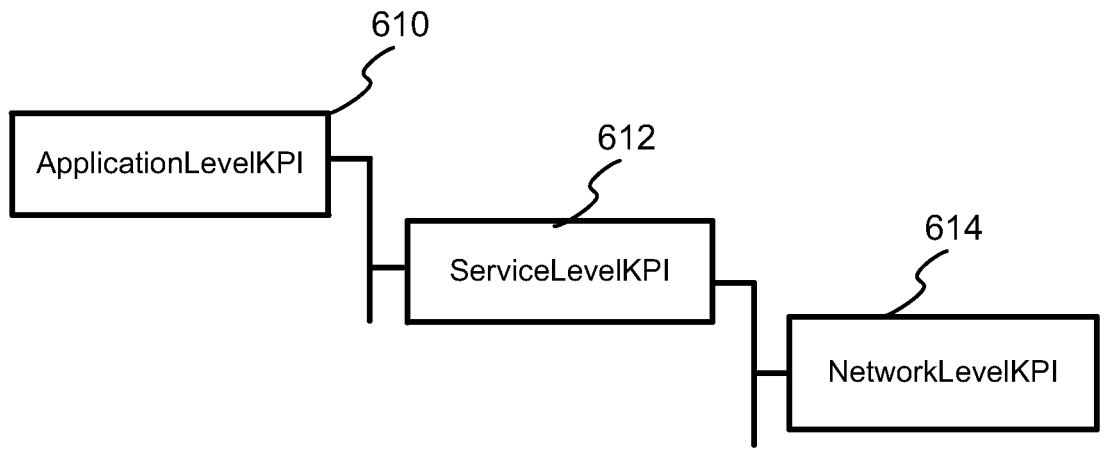
FIG. 6 is a block diagram illustrating an exemplary arrangement of the application level, service level, and network level management objects within the hierarchy of a management tree of an electronic device such as, for example, the management tree of the electronic device of FIG. 2, of management objects for key performance indicators contained in an application level MO, ApplicationLevelKPI MO, a service level MO, ServiceLevelKPI MO, and a network level MO, NetworkLevelKPI MO, in accordance with a representative embodiment of the present invention.

FIG. 6 is a block diagram illustrating an exemplary arrangement of the application level, service level, and network level management objects within the hierarchy of a management tree of an electronic device such as, for example, the management tree 267 of the electronic device 207 of FIG. 2, of management objects for key performance indicators contained in an application level MO, ApplicationLevelKPI MO 610, a service level MO, ServiceLevelKPI MO 612, and a network level MO, NetworkLevelKPI MO 614, in accordance with a representative embodiment of the present invention. As FIG. 6 shows, in some representative embodiments of the present invention, a management object comprising a collection of application level key performance indicators such as, for example, the ApplicationLevelKPI MO 610, has as one element a management object comprising a collection of service level key performance indicators, illustrated in FIG. 6 as the ServiceLevelKPI MO 612. In addition, the management object containing the collection of service level key performance indicators, ServiceLevelKPI MO 612, has as one of its elements a management object comprising a collection of network level key performance indicators, NetworkLevelKPI MO 614. It should be noted that although illustration of FIG. 6 shows only one management object containing service level key performance indicators as an element of the ApplicationLevelKPI MO 610, and only one management object containing network level key performance indicators as an element of the ServiceLevelKPI MO 614, these are not specific limitations of an embodiment of the present invention. Applications that involve the use of multiple services may have multiple management objects for service level key performance indicators, one for each service. Similarly, each management object for service level key performance indicators may have multiple management objects comprising network level key performance indicators, one for each bearer network used.

Figure 7:
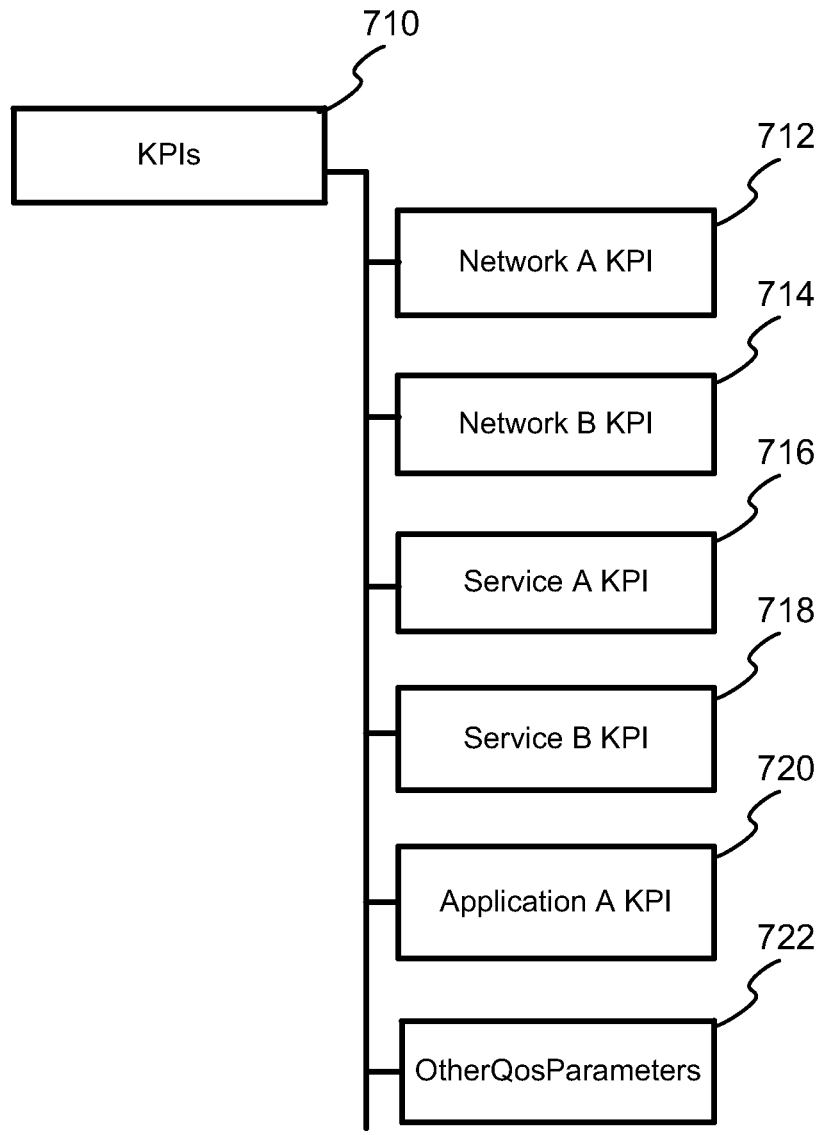
FIG. 7 is a block diagram illustrating another exemplary arrangement of management objects of key performance indicators within the hierarchy of a management tree of an electronic device such as, for example, the management tree of the electronic device of FIG. 2, in accordance with a representative embodiment of the present invention.

FIG. 7 is a block diagram illustrating another exemplary arrangement of management objects of key performance indicators within the hierarchy of a management tree of an electronic device such as, for example, the management tree 267 of the electronic device 207 of FIG. 2, in accordance with a representative embodiment of the present invention. As shown in the illustration of FIG. 7, in some representative embodiments of the present invention, a management object such as the KPIs MO 710 comprises a root node of a collection of nodes containing all key performance indicators. In various representative embodiments, such a collection could be organized as a logical tree. As shown in FIG. 7, collection of nodes of the KPIs MO 710 contains node Network A KPI 712 and node Network B KPI 714, which contain network-level key performance indicators for Network A and Network B, respectively. For each network, a KPI may be retrieved when needed from the Network A KPI 712 MO node and the Network B KPI 714 MO node. The collection of nodes of the KPIs MO 710 also comprises nodes Service A KPI 716 and Service B KPI 718, which contain service-level key performance indicators for Service A and Service B, respectively. Each service may provide its own KPI information, such as broadcast service, streaming audio service, etc. The example of FIG. 7 also illustrates that the KPIs MO 710 has as one of its element a node Application A KPI 720 that contains application-level key performance indicators. In a representative embodiment of the present invention, each application such as, for example, a broadcast client application MobiTV or a DVB-H client may provide its own KPIs that may be retrieved via a DM client and an associated management object. A representative embodiment of the present invention may also comprise a quality of service (QoS) parameters node, OtherQoSParameters 722.

In one representative embodiment of the present invention, a diagnostic client such as, for example, the diagnostic client 221 of FIG. 2 is told to collect KPIs or to provide KPIs from any or all of the application, service, and network layers. In such an embodiment, the diagnostic client 221 may use a diagnostic function for each application level KPI, for each network level KPI, and for each service level KPI. Such a diagnostic function may return an extensible meta language (XML) data string or the KPI values. The KPI value may be defined and supported by the original equipment manufacturer (OEM) of the electronic device 207, for example. In a representative embodiment of the present invention, device specific KPIs may be received by a diagnostic server such as the diagnostic server 129 of FIG. 1, and parsed using an XML schema, a data type definition (DTD), or XML structure information provided by the OEM of the electronic device 207, for example. In some representative embodiments of the present invention, the OEM may provide parsers used to parse the KPI data sent from the electronic device 207. Such parsers may be used by and/or "plugged into" a diagnostic server or a customer care server, such as the diagnostic server 229 of FIG. 2, or the customer care server 157 of FIG. 1, for example.

In a representative embodiment of the present invention, a network level KPI may comprise bearer-specific content, and an electronic device such as the electronic device 207 of FIG. 2, for example, may support multiple networks (i.e., bearers) at the same time. For example, the electronic device 207 may support a variety of networks such as a General Public Radio Service (GPRS) network, an SPRS network, a wireless local area network (WLAN), to name only a few examples. In one representative embodiment of the present invention, each network supported by the electronic device 207 has its own KPIs, and management objects supporting access to such KPIs by a remote server such as the device management server 209 and diagnostic server 229 of FIG. 2, or the customer care server 157 of FIG. 1, for example.

In a representative embodiment of the present invention, each software application in an electronic device (e.g., the application software 127 in the electronic device 107) may enable retrieval of its KPIs, via a device management (DM) client such as the DM client 263 of FIG. 2. For example, one representative embodiment of the present invention may support registration of an application's KPI node (i.e., a management object (MO) having the KPIs of the application as elements of the MO) with a DM client such as the DM client 263 of FIG. 2. Another representative embodiment of the present invention may employ an application manager to effect registration of an application with the DM client 263 of FIG. 2, or with a registry in the electronic device 207. Such registration may, for example, be performed as part of the installation of the application onto the electronic device during an update of software/firmware of the electronic device 207. For example, installation of a new software application (e.g., application software 227 of FIG. 2) may comprise not only adding new program code to memory in the electronic device 207 for the functionality of the application, but may also comprise the addition/creation of new management objects for the key performance indicators of the software application, any program code and/or data needed to permit the collection of the data of the key performance indicators for the software application, and any program code and/or data for making the key performance indicator values/content accessible via the associated management object(s). In a representative embodiment of the present invention, the update information for updating the software/firmware of the electronic device may include, for example, program code for suitable software/firmware components such as drivers, functions, routines, dynamic link libraries, and application program interfaces to permit the application to provide or expose KPI values/contents via the elements/nodes of the management object of the application. In a similar fashion, support for new services and networks may add new management objects, program code and data that enables access to service level and network level KPIs for the added service(s) and network(s).

In a representative embodiment of the present invention, a diagnostic client such as, for example, the diagnostic client 221 of FIG. 2 makes it possible to enable retrieval of KPIs, to disable retrieval of KPIs, and to configure collection of KPIs, to name a few capabilities. In some representative embodiments of the present invention, control over remote and/or local access to key performance indicators is provided through the use of addition nodes in a management tree such as, for example, the management tree 267 of FIG. 2. For example, an additional node (not shown) may be present as part of a management object such as, for example, the ApplicationLevelKPI MO 410 of FIG. 4, which permits access to the elements of the ApplicationLevelKPI MO 410 to be granted only for those device management activities that are previously authenticated. For example, an additional node (not shown) may be accessed by a remote server such as the DM server 209 or diagnostic server 229 to authenticate the server to the electronic device, and thereby enable the remote server to access the BufferSizes node 412, the MemoryUsage node 414, the FramesRates node 416, the ProblemEncountered node 418, and the UserPreferences node 420. It should be clear upon a careful reading and understanding of this disclosure that some key performance indicators may represent information considered private by, for example, a provider of services, by the manufacturer of an electronic device, and/or by a user of the electronic device, and that a representative embodiment of the present invention enables the remote collection of such private and detailed operational information for the electronic device on a real-time basis, during the operation of the electronic device by a user.

For example, in one representative embodiment of the present invention, a user of an electronic device such as, for example, the electronic device 207 may start a software application (e.g., application software 227 of FIG. 2) present on the electronic device 207, to exchange information content with a content server of a service provider. At some point in the use of the application, the user may experience problems with the operation of the software application and call a customer care representative to complain. When contacted by the user, the customer care representative uses a customer care server such as, for example, the customer care server 155, to cause key performance indicators associated with the use of the software application to be retrieved from the electronic device 207. The retrieval of the KPIs may be performed immediately, providing the last known values of the KPIs for the software application, or the customer care representative may arrange for collection of the KPIs for the application from the electronic device 207, during a later use of the software application. During a later use of the software application by the user, the content server of the service provider, or another server, may retrieve one or more key performance indicators associated with use of the software application that is experiencing difficulties, in real-time, during actual use of the software application on the electronic device 207. In this way, a representative embodiment of the present invention permits remote access to key performance indicators of multiple levels of a communication protocol, during use of the application and communication protocol in the electronic device. In a representative embodiment of the present invention, a remote server such as the customer care server 155 or the diagnostic server 129, of FIG. 1 analyzes the retrieved key performance indicators to determine the state of the various layers or levels of activity surrounding the operation of the software application. In this way, a representative embodiment of the present invention provides a window into the operation of a communication protocol used by an electronic device, in real-time, during the use of the software application under the conditions that cause unsatisfactory performance, enabling correction of any software, firmware, configuration, provisioning, and service provider issues that may be a source of the performance complaint.

In a representative embodiment of the present invention, device management functionality in the electronic device permits the monitoring of various levels of a communication protocol such as, for example, the application level, the service level, the network level, and enables communication of key performance indicators of those protocol levels to a remote server. The device management functionality and the type and encoding of the various key performance indicators that may be employed may be established in an industry standard or may be proprietary to the manufacturer of an electronic device. The manufacturer of an electronic device may provide to the operator of the infrastructure with which the electronic device communicates, applications software capable of parsing, disassembling, and/or interpreting the meaning of the key performance indicators communicated from the electronic device to a remote server. The server may be operated by the manufacturer of the electronic device, or such information may be communicated to the manufacturer from the server. In this manner, a representative embodiment of the present invention enables a manufacturer to remotely monitor, control and diagnose, for example, communication activities of an electronic device without the communication infrastructure having knowledge of the contents of the messaging used, and proprietary performance information for the electronic devices.

Figure 8:
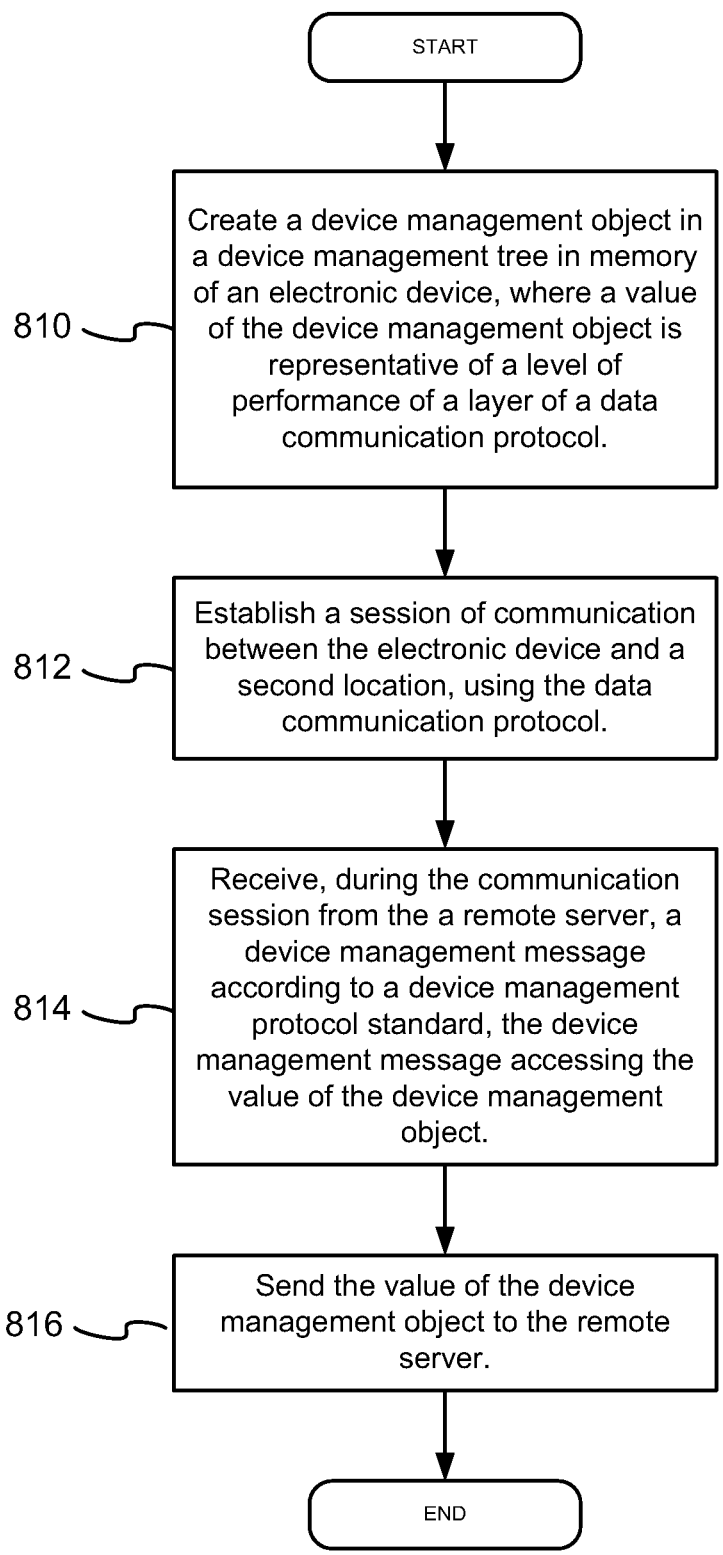
FIG. 8 is a flowchart illustrating an exemplary method of operating an electronic device that may correspond to, for example, the electronic device of FIG. 2, that employs management objects comprising key performance indicators to determine a cause of a performance issue during a communication session of the electronic device with a second location, in accordance with a representative embodiment of the present invention.

FIG. 8 is a flowchart illustrating an exemplary method of operating an electronic device that may correspond to, for example, the electronic device 207 of FIG. 2, that employs management objects comprising key performance indicators to determine a cause of a performance issue during a communication session of the electronic device 207 with a second location, in accordance with a representative embodiment of the present invention. In the exemplary method of FIG. 8, the electronic device may comprise, for example, a cellular phone, personal digital assistant, a pager, or a personal computer, to name only a few examples of devices. The method of FIG. 8 begins at block 810, at which the electronic device creates a device management object in a device management tree in memory of the electronic device. In a representative embodiment of the present invention, the value of the device management object is representative of a level of performance of a layer of a data communication protocol. Next, at block 812, the electronic device establishes a session of communication between the electronic device and a second location, using the data communication protocol.

At block 814, the electronic device receives, during the communication session from the remote server, a device management message according to a device management protocol standard, the device management message accessing the value of the device management object. In a representative embodiment of the present invention, the device management message may be communicated to the electronic device using, for example, a short message service (SMS) protocol over a wireless communication link, and the device management procotol standard may be compliant with, for example, the Open Mobile Alliance (OMA) device management (DM) version 1.2 or earlier protocol. Next, at block 816, the electronic device sends the value of the device management object to the remote server. The remote server may then perform analysis on the contents/value of the device management object, to determine a level of performance of a level/layer of the communication protocol used during the communication session.

Although described specifically in terms of key performance indicators of levels of a communication protocol, representative embodiments of the present invention have utility over a wide range of applications, and the above discussion is not intended and should not be construed to be limiting, but is offered as illustrative discussion of aspects of the invention.

Accordingly, a representative embodiment of the present invention may be realized in hardware, software, or a combination of hardware and software. Representative embodiments of the present invention may be realized in a centralized fashion in at least one computer system, or in a distributed fashion where different elements are spread across several interconnected computer systems. Any kind of computer system or other apparatus adapted for carrying out the methods described herein is suited. A combination of hardware and software may be a general-purpose computer system with a computer program that, when being loaded and executed, controls the computer system such that it carries out the methods described herein.

A representative embodiment of the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While aspects of the present invention have been described with reference to certain embodiments, it will be understood by those skilled in the art that various changes may be made and equivalents may be substituted without departing from the scope of the representative embodiments of the present invention. In addition, many modifications may be made to adapt a particular situation or material to the teachings of a representative embodiment of the present invention without departing from its scope. Therefore, it is intended that embodiments of the present invention not be limited to the particular embodiments disclosed herein, but that representative embodiments of the present invention include all embodiments falling within the scope of the appended claims.

Although a system and method according to the present invention has been described in connection with the preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

What is claimed is:

1. An electronic device comprising:
an interface for communicating with at least one remote server; and
one or more processors operably coupled to the interface and to memory, the one or more processors operable to, at least:
create at least one device management object in a device management tree in memory of the electronic device, wherein each of the at least one device management object in the device management tree includes a collection of performance indicators of a layer of a plurality of layers of a data communication protocol on the electronic device, wherein the at least one device management object includes an application management object of the device management tree, wherein the application management object includes a collection of performance indicators of an application layer of the data communication protocol associated with an application;
establish a session of communication between the electronic device and the at least one remote server using the data communication protocol;
receive, during the communication session using the data communication protocol, and during use of the application, a device management message according to a device management protocol standard from the at least one remote server, the device management message accessing the at least one device management object; and
send at least one value of the collection of performance indicators in the at least one device management object to the at least one remote server;
wherein the electronic device is a mobile electronic device.

2. The device according to claim 1, wherein the at least one device management object is an extension to the device management protocol standard.

3. The device according to claim 1, wherein the at least one device management protocol standard is compatible with the Open Mobile Alliance (OMA) device management (DM) version 1.2 or earlier protocol standard.

4. The device according to claim 1, wherein the interface communicates wirelessly.

5. The device according to claim 1, wherein the at least one device management object represents one or more of a network bandwidth, a network latency, a data rate, an error rate, and a number of dropped connections.

6. The device according to claim 1, wherein at least one of a format and content of the at least one device management object sent to the second of the at least one server is specified employing an extensible markup language (XML) data type definition (DTD) or an XML schema.

7. The device according to claim 1, wherein the at least one device management object is created during a remote update of one of software and firmware in memory of the electronic device.

8. The device according to claim 1, wherein communication between the electronic device and the at least one remote server uses a short message service (SMS) protocol.

9. One or more servers supporting management of a remote electronic device, the one or more servers comprising:
   at least one interface supporting communication with the remote electronic device; and
   at least one processor communicatively coupled to the at least one interface and to storage, the at least one processor operable to, at least:
   send a device management message according to a device management protocol standard to the remote electronic device, wherein the device management message accesses at least one device management object in a device management tree in memory of the remote electronic device according to the device management protocol standard, during a session of communication between the remote electronic device and a second location and during use of an application, wherein each of the at least one device management object in the device management tree includes a collection of performance indicators of a layer of a plurality of layers of a data communication protocol used during the communication session on the electronic device, wherein the at least one device management object includes an application management object of the device management tree, wherein the application management object includes a collection of performance indicators of an application layer of the data communication protocol associated with the application;
   analyze a value of the collection of performance indicators in the at least one device management object; and
   present a result of the analysis to a customer service representative;
   wherein the remote electronic device is a mobile remote electronic device.

10. The one or more servers according to claim 9, wherein the device management protocol standard is compatible with the Open Mobile Alliance (OMA) device management (DM) version 1.2 or earlier protocol standard.

11. The one or more servers according to claim 9, wherein the at least one device management object is an extension to the device management protocol standard.

12. The one or more servers according to claim 9, wherein accessing the at least one device management object uses a short message service (SMS) protocol.

13. The one or more servers according to claim 9, wherein the at least one processor communicatively is operable to, at least, cause the creation of the at least one device management object in the electronic device.

14. A method of operating an electronic device to support management by at least one remote server, the method comprising:
   creating at least one device management object in a device management tree in memory of the electronic device, wherein each of the at least one device management object in the device management tree includes a collection of performance indicators of a layer of a plurality of layers of a data communication protocol on the electronic device, wherein the at least one device management object includes an application management object of the device management tree, wherein the application management object includes a collection of performance indicators of an application layer of the data communication protocol associated with an application;
   establishing a session of communication between the electronic device and the at least one remote server using the data communication protocol;
   receiving, in the electronic device, during the communication session and during use of the application, a device management message according to a device management protocol standard from the at least one remote server, the device management message accessing the at least one device management object; and
   sending at least one value of the collection of performance indicators in the at least one device management object from the electronic device to the at least one remote server;
   wherein the electronic device is a mobile electronic device.

15. The method according to claim 14, wherein the at least one device management object is an extension to the device management protocol standard.

16. The method according to claim 14, wherein the at least one device management protocol standard is compatible with the Open Mobile Alliance (OMA) device management (DM) version 1.2 or earlier protocol standard.

17. The method according to claim 14, wherein the at least one device management object is created during a remote update of one of software and firmware in memory of the electronic device.

18. The method according to claim 14, wherein communication between the electronic device and the at least one remote server uses a short message service (SMS) protocol.

19. The device according to claim 1, wherein the at least one device management object in the device management tree further includes at least one of a service management object or a network management object, wherein the service management object includes a collection of performance indicators of a service layer of the data communication protocol, and wherein the network management object includes a collection of performance indicators of a network layer of the data communication protocol.

20. The device according to claim 19, wherein the application management object of the device management tree includes as one element at least one service management object, and wherein the at least one service management object includes as one element at least one network management object.

* * * * *